340-870.12 SR

OR 2,784,393

SEARCH ROOM

March 5, 1957 H. B. SCHULTHEIS, JR 2,784,393

FREQUENCY MULTIPLEX TELEMETERING SYSTEM

Filed Feb. 26, 1954

INVENTOR.
H. B. Schultheis, Jr.

BY

Attorney

United States Patent Office 2,784,393

Patented Mar. 5, 1957

2,784,393

FREQUENCY MULTIPLEX TELEMETERING SYSTEM

Harry B. Schultheis, Jr., Reseda, Calif., assignor to Bendix Aviation Corporation, North Hollywood, Calif., a corporation of Delaware Application February 26, 1954, Serial No. 412,876

3 Claims. (Cl. 340—185)

Figures 1, 2:
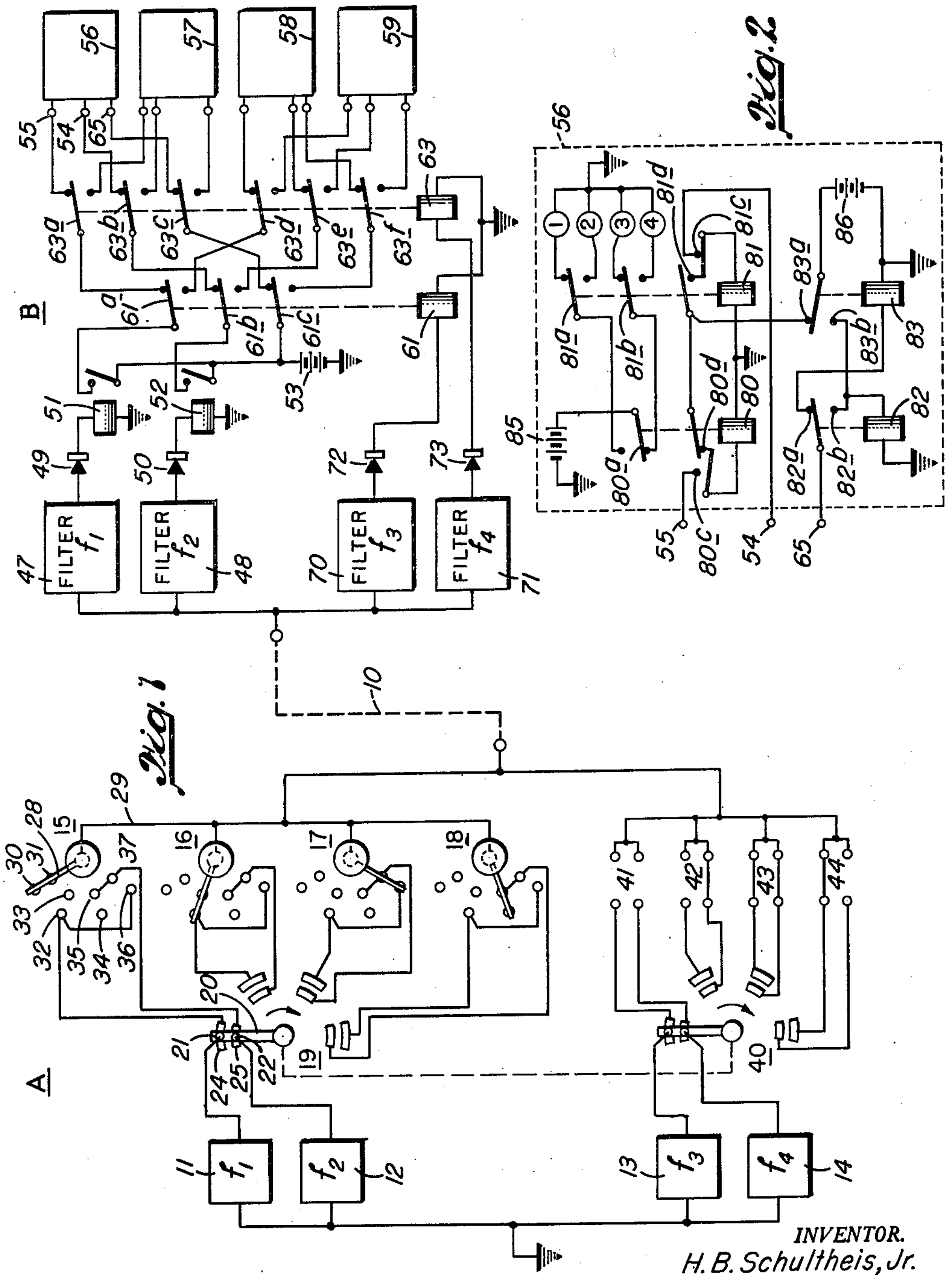

This invention relates to telemetering systems for transmitting data to a remote point.

An object of the invention is to provide a simple and practicable system for telemetering separate data to separate decoders, or read-out devices, at a remote point.

Other more specific objects and features of the invention will appear from the description to follow.

In accordance with the present invention, quantitative data are transmitted by a binary code, the different digits of which are represented by digital waves of different frequencies which are transmitted simultaneously, separated by filters at the receiving station, and decoded. Data from different sources are transmitted successively and successively applied to different decoders. It is broadly old to do this by time multiplex systems. The novelty in the present system resides in a new method of applying successively transmitted binary code quantitative signals from different sources to their associated decoders. It is accomplished by transmitting simultaneously with each quantitative binary code a second "designation" binary code identifying the decoder to which that quantitative code is to be applied. The designation code consists of digit waves of frequencies different from each other and from the digit waves of the quantitative code, so that they can be separated by filters at the receiving station. The use of a binary code for designating the destination of the quantitative code requires a relatively small frequency spectrum. As is well known, the number of different combinations possible with a digital binary code is $2^n$ where $n$ is the number of digits employed. Thus, with a designation code employing only two digital frequencies, any one of four decoders can be selected.

Since the switching to different decoders or read-out devices at the receiving station is controlled solely by a designation code transmitted simultaneously with the quantitative code, there is no synchronizing problem, and it is not even necessary that the signals from different sources be transmitted in any particular order.

A feature of the invention is a receiving apparatus that stores each quantity or value transmitted from any source until a subsequent signal is transmitted from that same source.

A full understanding of the invention may be had from the following detailed description with reference to the drawing, in which:

Fig. 1 is a schematic diagram of a complete system in accordance with the invention, and Fig. 2 is a schematic diagram of one of the read-out devices which is indicated by a block diagram in Fig. 1.

Referring to Fig. 1, there is shown a transmitting station A connected by a communication channel 10 to a receiving station B. The communication channel 10 may be of any known type, such as a metallic line circuit or a radio link, the only requirement being that it is capable of transmitting a plurality of different frequencies simultaneously.

At the transmitting station A there is provided a plurality of alternating current sources 11, 12, 13 and 14 of different frequencies $f1$, $f2$, $f3$ and $f4$, respectively. The frequencies $f1$ and $f2$ are used to transmit quantitative codes, and the frequencies $f3$ and $f4$ are used to transmit the designation codes. With a two-digit binary code utilizing the two frequencies $f1$ and $f2$, four different quantitative values can be transmitted, and with the two-digit binary code consisting of the frequencies $f3$ and $f4$, four different readings at the transmitting station can be applied to four separate read-out devices at the receiving station.

Thus, the transmitter comprises four separate quantitative coding switches 15, 16, 17 and 18, all of which may be identical and are successively connected, one at a time, to the sources 11 and 12 by a switch 19. As shown, this switch consists of an arm 20 adapted to be rotated and having two brushes 21 and 22 which are connected respectively to the sources 11 and 12 and are adapted to make contact with any one of four sets of contacts associated with the coding devices 15, 16, 17 and 18. Thus, the two contacts 24 and 25 are connected to the coding switch 15. This switch comprises a rotatable conductive arm 28 which is connected by a conductor 29 to the transmission channel 10. The arm 28 is movable into any one of four different positions in each of which it engages a different pair of contacts. The arm 28 may be manually positionable or may be adapted to move in response to some physical stimulus, such as pressure or temperature, the values of which are to be transmitted. In one position (that shown in the drawing), the arm 28 engages two dead contacts 30 and 31 so that in this position it transmits neither $f$, nor $f2$. In the next position it engages a contact 32 that is connected to the source 11 and to a contact 33 which is dead. In this position the current of frequency $f1$ is transmitted. In the third position the arm 28 closes on two contacts 34 and 35, one of which is dead but the other of which is connected to the current source 12, so that in this position current of frequency $f2$ is transmitted. In the 4th position the arm contacts two contacts 36 and 37, one of which is connected to the source 11 and the other of which is connected to the source 12, so that currents of frequencies $f1$ and $f2$ are simultaneously transmitted. It will be observed that in the four positions of the arm 28 all of the four possible combinations in a two-digit binary code are represented.

A second switch 40, movable in synchronism with the switch 19, functions in the same general manner as the switch 19, to connect the sources 13 and 14 to any one of four different coding switches 41, 42, 43 and 44, which coding switches are permanently set instead of being selective, as are the coding switches 15, 16, 17 and 18. Thus in the first position of the switch 40, as shown, the sources 13 and 14 are connected to a switch 41 that is open, so that no current is applied to the transmission channel 10. In the second position of the switch 40 only the source 14 is connected to the line 10, transmitting frequency $f4$ thereto. In the third position of the switch both sources 13 and 14 are connected to the line 10 transmitting both frequencies $f3$ and $f4$. In the fourth position of the switch 40, source 13 is connected to the transmission line, but source $f4$ is disconnected.

As stated, the switches 19 and 40 always move together so that whenever the quantitative coding device 15 is connected to the communication channel 10, the sources 13 and 14 are connected to the coding switch 41; when the connection from the quantitative coding sources 11 and 12 is made through the coding switch 16, then connection between the designation currents from sources 13 and 14 to the line is made by the switch 42, etc. Both switches 19 and 40 may be rotated continuously to successively apply to the communication channel 10 signals controlled by the different coding switches 15, 16, 17 and 18 and the switches 41, 42, 43 and 44. However, this is not necessary, and if desired the switches 19 and 40 can be manipulated in random fashion, but always in unison with each other, from any position to any other position.

At the receiving station, four filters 47, 48, 70 and 71 are connected to the communication channel 10, each of these filters being designed to pass one of the four frequencies $f1$, $f2$, $f3$ or $f4$ and block the other three. The outputs of the filters 47 and 48 may be rectified by rectifiers 49 and 50, respectively, and applied to relays 51 and 52, respectively. These relays 51 and 52 have normally open contacts which, when the relays are energized, connect one terminal of a current source 53 to one or both of the code input terminals 54 and 55 of one of four different read-out devices 56, 57, 58 and 59. The designation code passed by the filters 70 and 71 determines which one of the four read-out devices is connected to the relays 51 and 52.

Thus, the output of filter 70 is connected through a rectifier 72 to a relay 61, and the output of filter 71 is connected through a rectifier 73 to a relay 63. These relays 61 and 63 have contacts connected in a tree circuit which functions to connect the output contacts of relays 51 and 52 to different ones of the four read-out devices 56, 57, 58 and 59, depending upon which, if any of these relays 61 and 63 are energized. They also function to connect the local source 53 to a "control" terminal 65 on the selected one of the read-out devices 56 to 59.

Thus, the relay 61 is provided with three movable contacts 61*a*, 61*b* and 61*c* connected respectively to the normally open contacts of the relays 51 and 52 and to the source 53, and the relay 63 has six movable contacts 63*a* to 63*f*, inclusive, each connected to a different one of the fixed contacts of the relay 61. Each of the movable contacts of relay 63 is always closed on one or the other of two fixed contacts which are connected to the code input terminals 55 and 54 and the control terminal 65 of the four read-out devices 56, 57, 58 or 59. The tree circuit involving the contacts of the relays 61 and 63 is an old and well-known decoding arrangement responsive to the condition of the relays 61 and 63 which are controlled by the designation currents of frequencies $f3$ and $f4$. The arrangement is such that when neither frequency $f3$ nor $f4$ is received both the designation code relays 61 and 63 are released, and the code input terminals 55 and 54 and the control terminal 65 of the read-out device 56 are connected to the movable contacts 61*a*, 61*b* and 61*c*, respectively, of relay 61. When frequency $f4$ only is received, relay 63 is pulled, and the read-out device 57 is rendered active. When both frequencies $f3$ and $f4$ are received, relays 61 and 63 are both pulled, and read-out device 59 is rendered active. When only frequency $f3$ is received, the relay 61 only is pulled, and the read-out device 58 is rendered active. It will be apparent, therefore, that one or the other of the four read-out devices is rendered active according to the position of the switch 40 at the transmitting station.

Referring now to Fig. 2, each read-out device comprises a pair of digit-storing relays 80 and 81, respectively, an interlock relay 82, and a number change relay 83. The relay 80 has contacts 80*a*, and the relay 81 has contacts 81*a* and 81*b* arranged in a tree circuit with a current source 85 and four indicator lamps 1, 2, 3 and 4, respectively, so that one or the other of the four lamps is energized, depending upon whether relays 80 and 81 are both released or both pulled, or relay 80 is released and relay 81 is pulled, or relay 80 is pulled and relay 81 released.

Each of the relays 80 and 81 also has normally closed contacts 80*c* or 81*c* and normally open contacts 80*d* or 81*d* which are associated with the energizing circuits of their own relays and are also associated with the relays 82 and 83. The relay 82 has normally closed contacts 82*a* and normally open contacts 82*b*, and the relay 83 has normally closed contacts 83*a* and normally open contacts 83*b*.

As will subsequently appear, the digit storage relays 80 and 81 lock up when operated and remain locked until the read-out device in which they are located is again connected through a contact on relay 63 and through contact 61*c* on relay 61, to the current source 53 (Fig. 1).

Let it be assumed that during the previous operation the digit storage relay 80 was energized. When this relay pulled, it created for itself a holding circuit extending from one terminal of a current source 86 through the normally closed contacts 83*a* of relay 83 through the normally open contacts 80*d* of relay 80 through the latter relay to the other ground terminal of source 86.

Now let it be assumed that the switches 19 and 40 at the transmitting station are moved into the position shown so that no one of frequencies $f1$, $f2$, $f3$ or $f4$ is transmitted to the receiving station. Therefore, all four relays 51, 52, 61 and 63 will be released, none of the code input terminals 55 and 54 of any of the read-out devices will be energized, but the control terminal 65 of read-out device 56 will be energized by connection to the source 53.

Referring now to Fig. 2, current flows from the control terminal 65 through the normally closed contacts 82*a* of relay 82 through the relay 83 to ground pulling relay 83 to open contacts 83*a* and close contacts 83*b*. The opening of contacts 83*a* opens the holding circuit from source 86 to the digit storage relay 80, permitting the latter to release. Both digit storage relays 80 and 81 are now in released condition and remain that way, because neither of the code input terminals 55 and 54 is energized. With both of the relays 80 and 81 energized, lamp 1 is energized over the normally closed contacts of the coding contact group 81*a* and the coding contact group 80*a*.

Energization of the number change relay 83, in addition to opening the holding circuit of the digital storage relay 80, completed a circuit from the source 86 through the interlock relay 82 to ground, causing relay 82 to pull. This opens the normally closed contacts 82*a* of relay 82, releasing the number change relay 83, which remains released. At the same time, the closure of contacts 82*b* completes a holding circuit from the control terminal 65 through relay 82, and relay 82 holds as long as current is applied to the control terminal 65. When current is removed from the control terminal 65 by selection of another one of the code read-out devices 57, 58 or 59, the relay 82 releases. The number change relay 83 remains released following the release of the interlock relay 82, because no current is impressed on the control terminal 65.

If, instead of the quantitative code that was transmitted being 0–0 (that is, involving the transmission of neither frequency $f1$ nor $f2$), one of these frequencies had been transmitted, then following the operation of the number change relay 83 one or the other of the digit storage relays 80 or 81 would have been actuated by current received over its associated code input terminal 55 or 54, and that relay would have locked up over its normally open contacts 80*d* or 81*d* through the normally closed contacts 83*a* of the number change relay 83.

The overall operation is that, depending upon the position of the switch 40, one or the other of four possible combinations of the frequencies $f3$ and $f4$ is transmitted to connect the outputs of the quantitative code relays 51 and 52 to that one of the read-out devices 56, 57, 58 or 59 determined by the position of the switch 40. When any read-out device is selected, its control terminal 65 is energized to first pull the number change relay 83 and release either or both of the digital storage relays 80, 81 if they were previously operated. The energization of the number change relay 83 is immediately followed by the energization of the interlock relay 82, and the pulling of the latter releases the number change relay 83 which completes at its contacts 83*a* a holding circuit to each of the digital storage relays 80 and 81, so that if either is operated by energization of one of the code input terminals 55 or 54 it holds until that read-out device is again energized.

For the purpose of simplifying the drawing and the explanation of the invention, the simplest possible binary digital codes have been used involving only two code frequencies in both the quantitative code and the designation code. It will be understood that more than four read-out devices can be incorporated in the system by increasing the number of different designation code frequencies over the two shown. If three frequencies are employed instead of two, eight different read-out devices can be selected.

Likewise, the quantitative data that can be transmitted can be increased to any desired extent by increasing the number of the frequencies in the quantitative code.

Although for the purpose of explaining the invention a particular embodiment thereof has been shown and described, obvious modifications will occur to a person skilled in the art, and I do not desire to be limited to the exact details shown and described.

I claim:

1. A telemetering system for telemetering from a transmitting station to a receiving station over a single communication channel comprising: means at the transmitting station for sequentially transmitting over said communication channel separate signals, each separate signal including simultaneously a quantitative code consisting of a selected combination of a first group of digit waves of different frequencies and a designation code consisting of a selected combination of a second group of digit waves of different frequencies; detecting means at the receiving station for receiving, separating and detecting all said digit waves; a plurality of code read-out devices at the receiving station corresponding respectively to different designation codes and each having a plurality of code input terminals, one for each digit wave of said first group; switching means selectively responsive to different detected designation codes for applying the detected digit waves of the received quantitative code to the code input terminals of the corresponding read-out device; and decoding means in each read-out device selectively responsive to different detected quantitative codes applied to its code input terminals for indicating a condition represented thereby.

2. A system according to claim 1 including at said receiving station a separate control terminal for each read-out device and circuit means including said switching means for selectively energizing the control terminal of the read-out device corresponding to the received designation code, each read-out device comprising: a number change relay having normally closed contacts and normally open contacts; an interlock relay having normally closed contacts and normally open contacts; a plurality of binary code digit-storing relays, one for each of said code input terminals, each storage relay having normally closed contacts and having normally open contacts; a holding circuit for each digit storage relay including its normally open contacts and the normally closed contacts of said number change relay; an exciting circuit for each storage relay connecting it through its normally closed contacts to the associated code input terminal; an exciting circuit for said number change relay connecting it through the normally closed contacts of said interlock relay to said control terminal whereby energization of said control terminal energizes the number change relay to release any previously held digit storage relay and enable energization of each digit storage relay by a detected quantitative code impulse applied to its associated digit terminal; an energizing circuit for said interlock relay including the normally open contacts of said number change relay whereby pulling of the latter energizes the interlock relay to open the energizing circuit of the number change relay and thereby release it; a holding circuit for said interlock relay connecting it through its normally open contacts to said control terminal whereby it holds during energization of said control terminal; and means including contacts on said digit storage relays responsive to the positions of said relays for reading out the quantitative code impressed on said code terminals.

3. A system according to claim 1 including at said receiving station a separate control terminal for each read-out device and circuit means including said switching means for selectively energizing the control terminal of the read-out device corresponding to the received designation code, each read-out device comprising: digital storage relays for storing quantitative codes applied to said code input terminals, and means responsive to energization of said control terminal to first release any storage relay previously operated and then condition said storage relays for reoperation in response to said detected digit waves simultaneously applied to said code input terminals by said switching means.

References Cited in the file of this patent

UNITED STATES PATENTS

| | | |
|---|---|---|
| 1,929,241 | Franklin | Oct. 3, 1933 |
| 2,450,516 | Kinkead et al. | Oct. 5, 1948 |